United States Patent [19]

Davis

[11] Patent Number: 5,139,664
[45] Date of Patent: * Aug. 18, 1992

[54] PLATE AND CELL HOLDER

[75] Inventor: Steven S. Davis, Farmington, Utah

[73] Assignee: Baker Hughes Incorporated, Houston, Tex.

[*] Notice: The portion of the term of this patent subsequent to Aug. 6, 2008 has been disclaimed.

[21] Appl. No.: 741,015

[22] Filed: Aug. 6, 1991

Related U.S. Application Data

[63] Continuation of Ser. No. 441,858, Nov. 27, 1989, Pat. No. 5,037,540.

[51] Int. Cl.⁵ .............................................. B01D 25/12
[52] U.S. Cl. ............................ 210/224; 100/194; 100/198; 100/199; 210/227; 210/232
[58] Field of Search .............. 210/97, 136, 224, 225, 210/227, 230, 231, 232, 237, 236, 228; 204/253, 252; 100/194, 196, 197, 198, 199, 200

[56] References Cited

U.S. PATENT DOCUMENTS

| | | | |
|---|---|---|---|
| 4,107,042 | 8/1978 | Heinrich et al. | 210/225 |
| 4,129,495 | 12/1978 | Fitch | 204/253 |
| 4,196,084 | 4/1980 | Schotten | 210/224 |
| 4,343,235 | 8/1982 | Jones | 210/230 |
| 4,351,724 | 9/1982 | Jones | 210/230 |
| 4,362,616 | 12/1982 | Gehrmann et al. | 210/225 |
| 4,364,827 | 12/1982 | Guttman | 210/225 |
| 4,623,453 | 11/1986 | Davenport | 210/225 |
| 4,806,239 | 2/1989 | Davis | 210/225 |
| 4,892,665 | 1/1990 | Wettlaufer | 210/225 |
| 5,037,540 | 8/1991 | Davis | 210/225 |

FOREIGN PATENT DOCUMENTS 57-34009  7/1982  Japan .................................. 210/230

Primary Examiner—Robert A. Dawson
Assistant Examiner—Sun Uk Kim
Attorney, Agent, or Firm—Skjerven, Morrill, MacPherson, Franklin & Friel

[57] ABSTRACT

A filter plate press or an electrolyzer cell has a series of filter plates or cell frames, respectively, which are moved as a stack against a press or cell headpiece by a follower moved by one or more rodded cylinders mounted on a fixed bracket. Scissors mechanisms extending on each side of the press/cell holder and between the bracket and follower assure precise parallel movement of the follower with respect to the headpiece. To accommodate any cumulative errors in the stack dimensions the scissor mechanisms are disengageable upon closure of the press/cell holder so that the follower has freedom to match the abutting surface of the plate/cell frame stack and thus evenly seal the abutting peripheral edges of the plates/cell frames. A pair of plate pawl-containing carriages mounted on a pair of synchronized lead screws extending parallel to a pair of plate/cell frame guide rails on the press are provided to assure simultaneous pick-up of opposed handles of each plate/cell frame being moved for cake discharge or plate/cell frame washing.

6 Claims, 5 Drawing Sheets

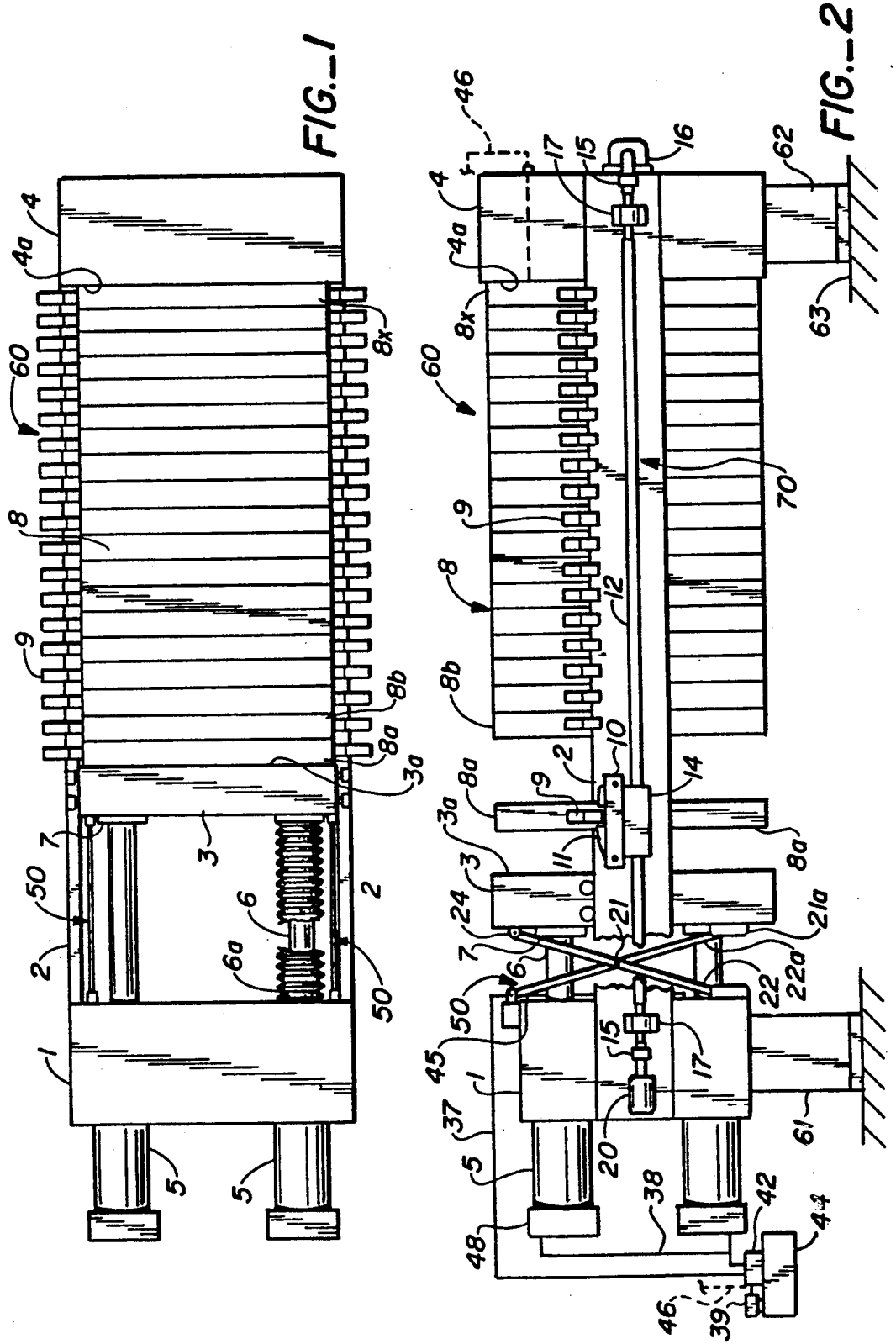

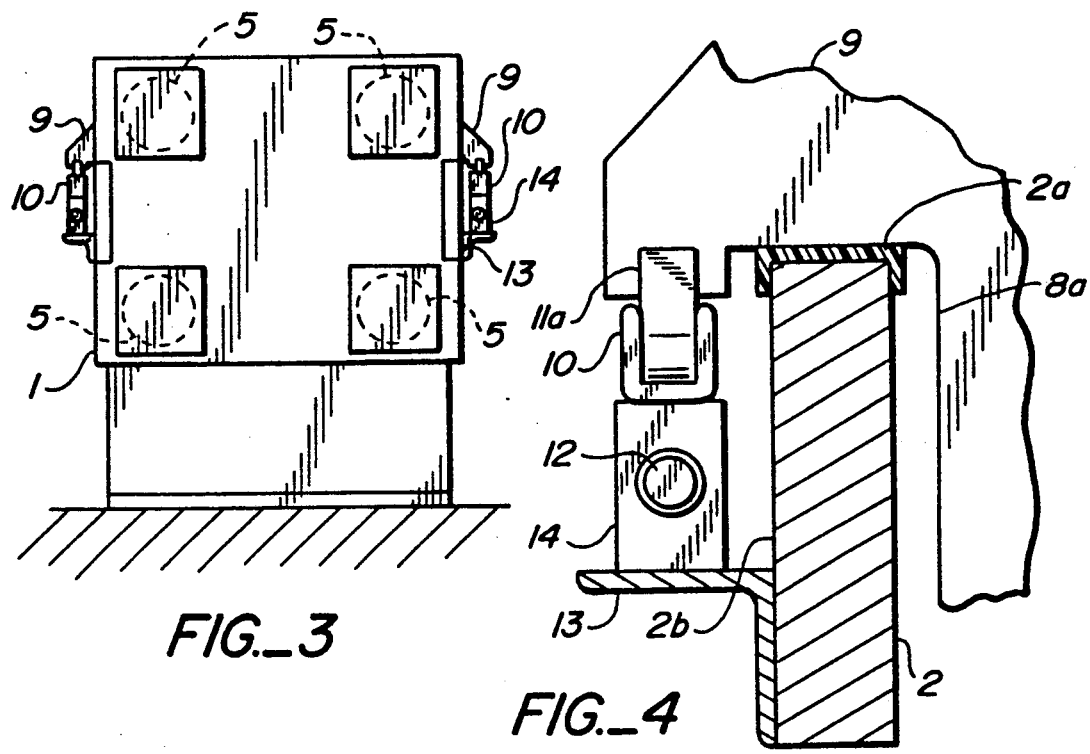
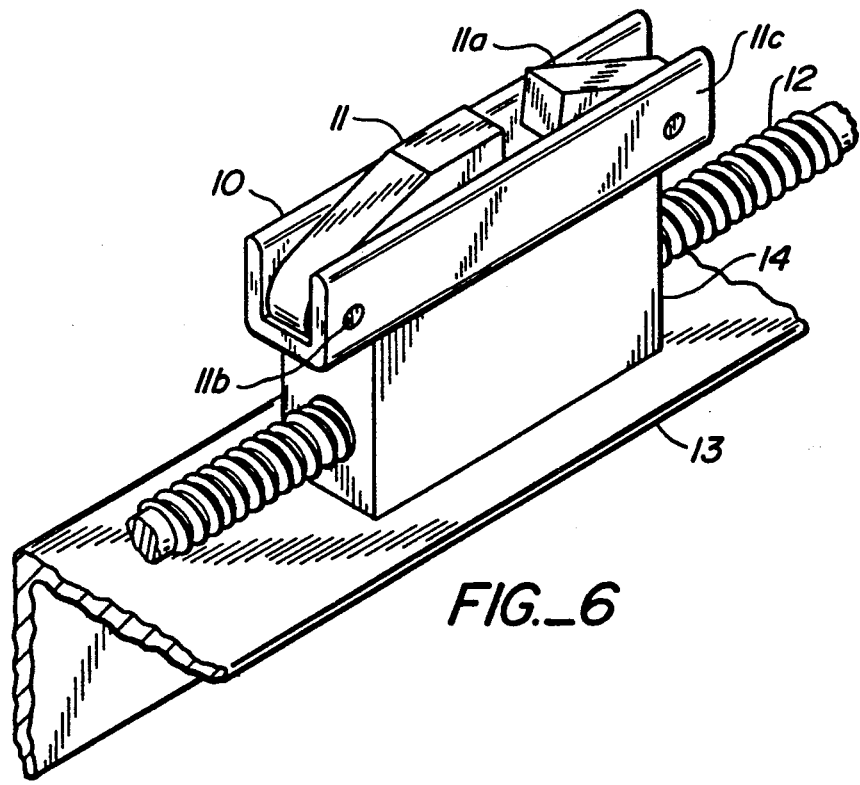

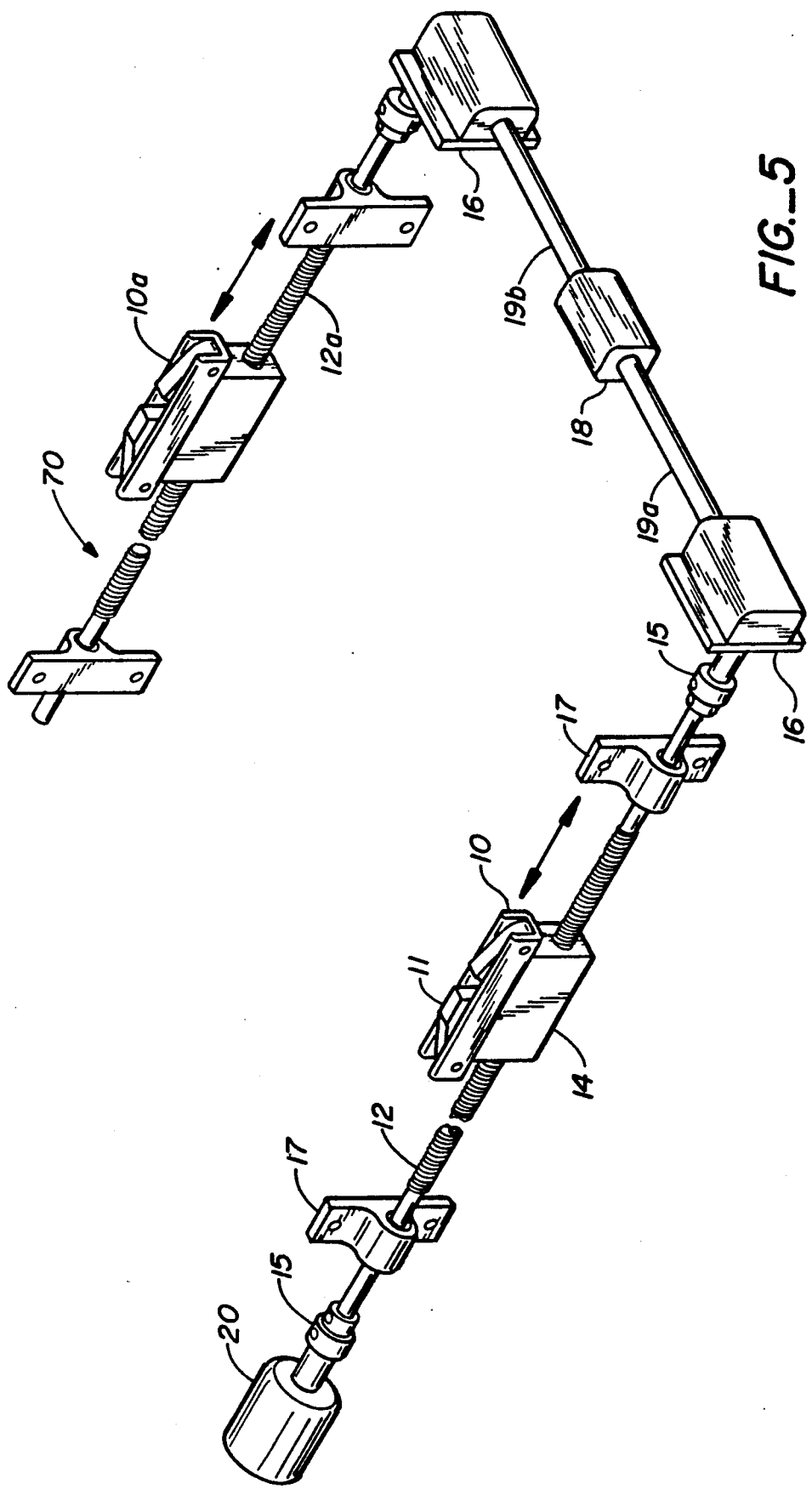

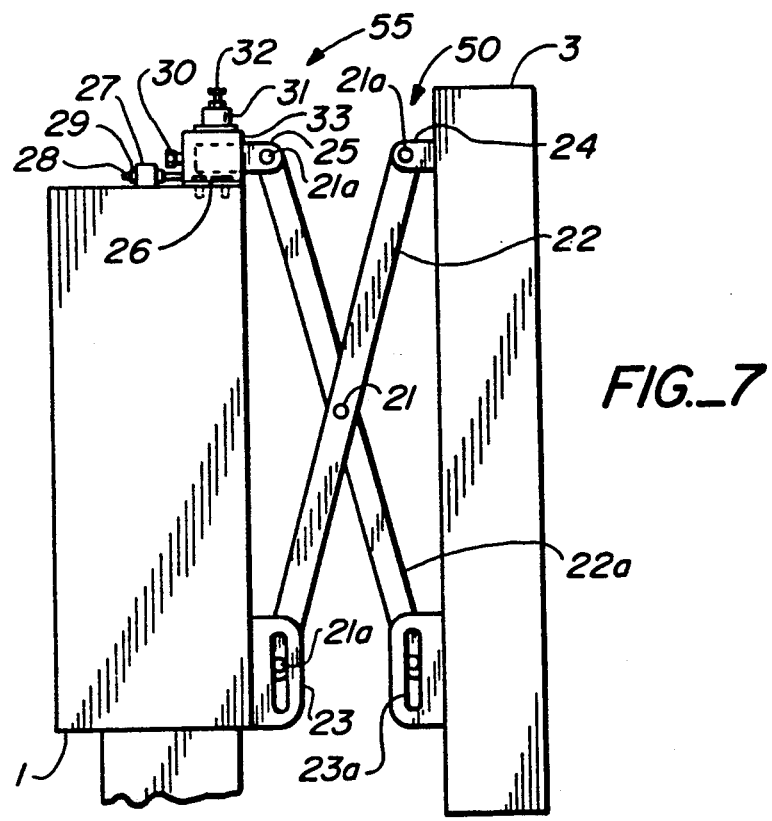
FIG._7
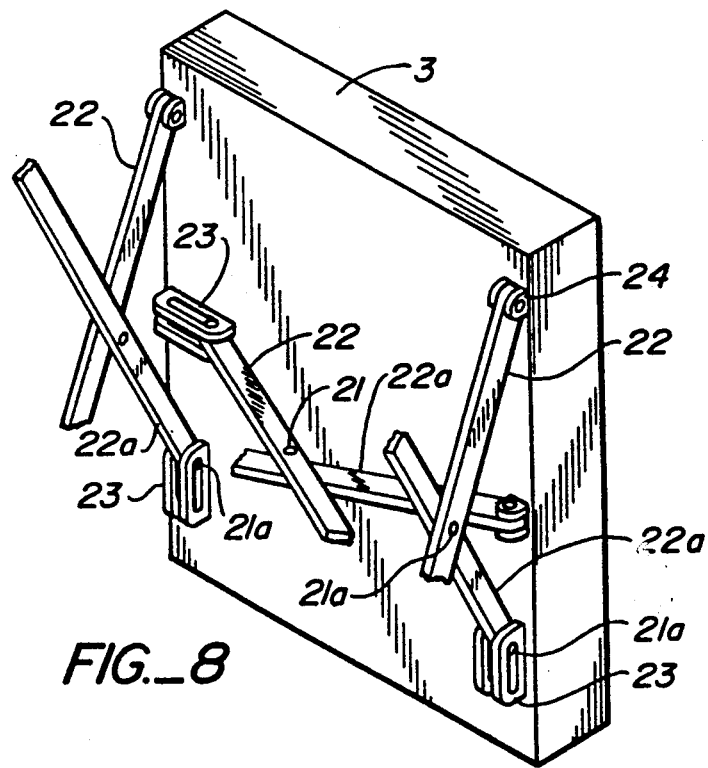
FIG._8

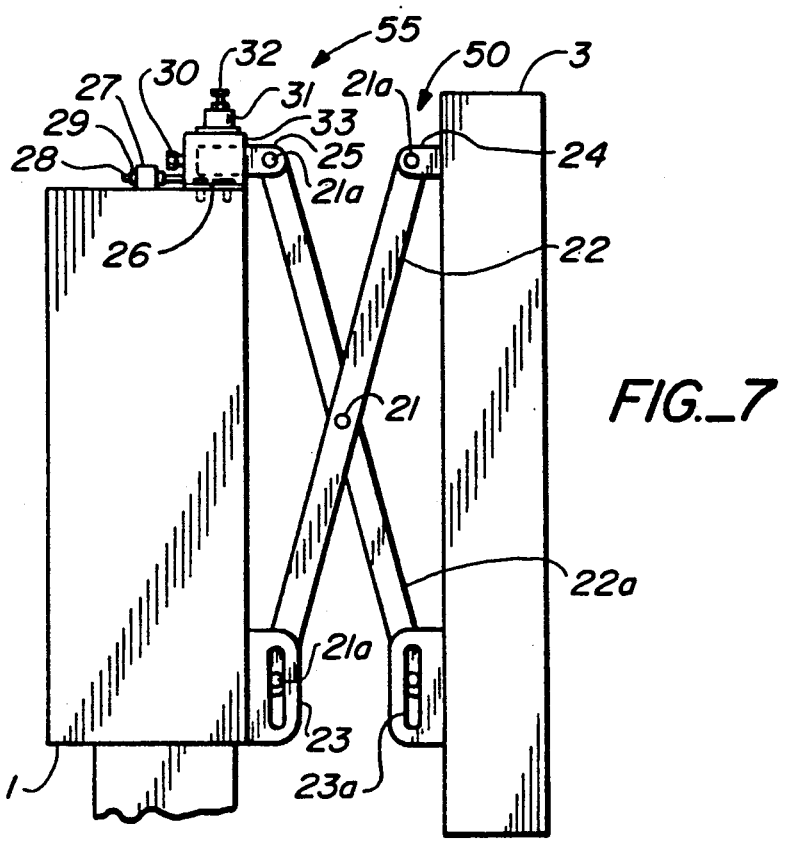
FIG._7
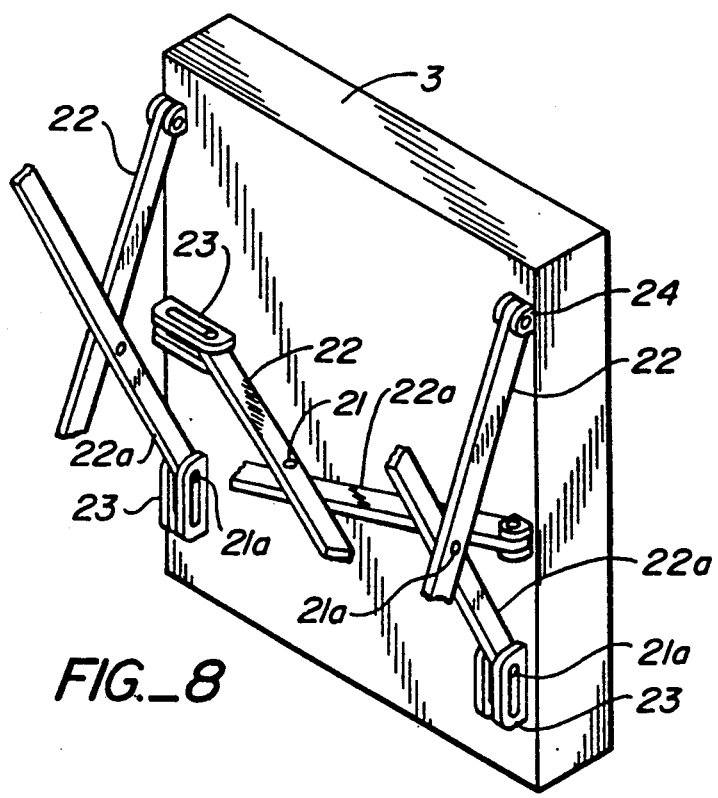
FIG._8

PLATE AND CELL HOLDER

This application is a continuation of application Ser. No. 07/441,858, filed Nov. 27, 1989, now U.S. Pat. No. 5,037,540.

BACKGROUND OF THE INVENTION

1. Field of the Invention

This invention relates to filler presses and electrolyzers, having respectively a plurality of plates for separating solids from liquids or a plurality of plate-like cells including a pair of anode and cathode compartments facing each other with an ion exchange membrane therebetween. More specifically the invention is directed to apparatus for assuring that a stack of plates or cells are precisely positioned with respect to a press/cell follower and head piece and are adequately sealed to prevent leakage.

2. Statement of the Art

Prior art filter presses such as seen in U.S. Pat. Nos. 4,107,042; 4,364,827; and 4,806,239 all show presses which utilize a fixed head piece and a follower with a stack of plates therebetween where a hydraulic ram arrangement drives the follower against an end plate of the stack to move all the plates in the stack into engagement. The handles of plates normally slide on a pair of side slide rails or the plates are suspended from and movable on an overhead rail(s). Various pawl and piston arrangements mounted in a carriage have been proposed to shift individual ones or groups of plates in the stack for subsequent on the plates during the filtration cycle, and thereafter for washing the filter media surfaces on individual plates preparatory to another filtering cycle. In the case of electrolyzers a series of cell frames typically with a height of 1.2 meters and a width of 2.4 meters form a plate. Each plate is bisected by a metal partition wall forming anode and cathode compartments. Each compartment has an electrolyte inlet and an electrolyte and gas outlets, and an ion exchange membrane is installed between each anode compartment and cathode compartment. Handles are attached to each cell frame in order to hang the frames typically on side rails of a head and follower press. Due to the corrosive nature of the various materials being filtered, the electrolytes used and gasses emitted from operation of the electrolyzer, it has been necessary to have special seals and the like on the plates and cell frames to prevent egress of corrosive or other harmful unsafe products from the plates or cell press. Further, specifically in the case of the electrolyzer the ion exchange membrane between the cell frames is highly sensitive to a uniform sealing pressure. The press industry has generally relied on the use of precise rail surfaces and handle surfaces along with a center activated follower to insure a fair degree of alignment of the plates or cells with or without special edge sealing of the plates or cell frames with respect to one another. Despite these constructions it has been found that the plates and cell frames are difficult to align in parallelism since one or more plates or cell frames can become canted during movement of the follower to close the stack of plates or cell frames or cumulative manufacturing errors can cause misalignment.

SUMMARY OF THE INVENTION

The present invention addresses the problem of very accurately maintaining the follower of a press square with the fixed head piece and thereby to move each of the stacked plates or cell frames to a "stack closed" position with accurate alignment. At the same time, particularly in the case of the electrolyzer application involving cell frames, once the stack has reached what is called the nominal closed position by operation of the moving follower, the apparatus which assures rectilinear movement of the follower and parallelism of the facing surfaces of the follower and head piece is disengaged so that the follower is then free to match the stack facing surface when contact and the initial nominal closing is completed. The above action may be provided by a pressure switch associated with the closing cylinder(s) which closes as soon as stack closing pressure builds up to a predetermined pressure. Upon disengagement, the follower which is still being forced against the headpiece, more particularly the stack of plates/cell frames, is free of the controller rectilinear movement and can "match" the exact nominally vertical and horizontal orientation of the stacked plates/cell frames thus providing even pressure around the entire periphery of the facing plates/cell frames. The follower initially is kept rectilinear in motion by a means typically a pair of scissor mechanisms extending between a press follower and a fixed bracket supporting the cylinder casing. As the cylinder pressure builds to a certain pressure indicative of stack closure the scissors mechanism unlocks allowing free movement of the follower against the stack. The scissors mechanism is reengaged after the follower is fully retracted to a stack "open" position and squared with respect to the cylinder bracket. In another embodiment, a spring and detent ball arrangement operable when the follower contacts a stack out of parallelism with the follower, acts to disengage the scissors mechanism.

A further feature of the invention provides a pair of shifter carriages operable in a gear train so that the carriages have synchronous movement on both sides of the plate/cell frame stack. This is done by providing pawlcontaining shifting carriages on each side of the press mounted on threaded screws rotated in a clockwise or counterclockwise direction by a single motor to move the carriages in unison. A connecting gear train and phase box extends between the screws to obtain exact precision of movement.

A further feature of the invention provides a special pilot operated check valve to maintain a cylinder(s) pressure(s) to accommodate changes in internal pressure of the plates or cells thus giving a constant sealing pressure on the sealing perimeter of abutting plates and cells.

BRIEF DESCRIPTION OF THE DRAWINGS

FIG. 1 is a top plan view of the press for stacking filter plates or cell frames.

FIG. 2 is a side view thereof.

FIG. 3 is an end view thereof.

FIG. 4 is a detailed partial end view of a shifter carriage and guide rail of the press.

FIG. 5 is a perspective view of the shifter carriages and connecting gearing positioned across the press side rails.

FIG. 6 is a perspective view of the shifter carriage and threaded screw drive.

FIG. 7 is a side view of a scissors-type mechanism of the invention for guiding the press follower in parallelism with the press head to contact and close the press plates or cell frames.

FIG. 8 is a perspective view thereof showing scissor mechanisms for both horizontal and vertical alignment.

FIG. 9 is a cross-sectional view of a release means for disengaging the scissors mechanisms upon press closure.

FIG. 10 is a schematic view of a built-in pilot operated check valve to maintain a constant seal pressure on the plate/cell frame perimeter as the pressure inside the plate/cell frame varies.

DETAILED DESCRIPTION

The press 60 shown in top view in FIG. 1 includes a cylinder bracket 1 fixedly supported at a ram end of the press across a pair of fixed support rails 2, a movable press follower 3 also extending across the rails and slidable or rollable thereon, a head piece 4 fixedly supported at a head end of the press, and a stack 8 of a series of parallel filter plates or cell frames 8a, 8b to 8x, sometimes known as cell holders, slidably carried by plate or frame handles 9 across the rails. One or more high pressure hydraulic cylinders 5, typically each providing from about 50 to 200 tons (U.S.) of closing force, are mounted on bracket 1 cylinder piston rods 6, covered by flexible rubber boots 6a, extend out from the cylinders 5 and are affixed to a rod adapter 7 on the follower 3. The device above described is typically of a filter press and electrolyzer cell holder. As set forth in the summary of the invention is it highly desirous to move the follower with respect to the bracket so that the follower rides in parallelism, with the head piece. In erecting the press the fixed cylinder bracket 1 and headpiece 4 are aligned in accurate parallelism, with the dual side rails 2 being orthogonal thereto. Legs 61, 62 (FIG. 2) support the cylinder bracket and the headpiece and thus the overall press on a floor surface 63. The invention entails providing a means, typically in the form of a scissor mechanism 50, juxtaposed to each rail at opposite sides of the press and the press plates/cell frames, and extending between the cylinder bracket 1 and follower 3 parallel to the cylinder and its piston rod for assuring rectilinear motion of the follower so that the follower operating face 3a is parallel to the front face 4a of the headpiece 4.

As seen in FIG. 2 the scissor mechanism 50 includes a pair of scissor arms 22, 22a having a pivot pin 21 at a midpoint therebetween, each arm being pivoted at their ends in spaced lugs 24 on both the cylinder bracket and follower. The scissor mechanism is shown in more detail in FIGS. 7 and 8.

A plate/cell frame shifting mechanism 70 (not shown in FIG. 1) is connected (FIG. 2.) along a side of the rails 2 for shifting one or a group of plates/cell frames to various positions between the follower and the head piece and with respect to the remaining plates/cell frames of the stack. The shifting mechanism comprises a threaded lead screw 12 mounting a plate/cell frame shifter carriage 10 having a threaded block 14 depending therefrom which block is movable along the lead screw in one direction or another dependent upon clockwise or counter-clockwise rotation of the lead screw. The lead screw 12 is supported on bearings 17 fixed on a support track 13 (FIG. 4) and connected to a reversible motor 20 by coupling 15. A right angle gear box 16 is provided to connect the screw 12 to another similarly mounted screw 12a on the opposite side rail through a phase box 18 (FIG. 5) so that both screws 12, 12a are driven by the common motor 20 in unison to provide simultaneous pick-up of the handles of a plate/cell frame on both sides of the press. Each of the shifter carriages 10 include at least two pawls 11 which may be shiftable and controlled in the same manner as set forth in U.S. Pat. No. 4,806,239 or as otherwise known in the filter plate press art. In FIG. 2 the pawls are shown in an UP position about to contact a plate/cell frame handle 9 to convey a plate/cell frame to a particular position on the rails for washing, loosely stacking or unstacking for cake discharge, media or membrane inspection, or other process step.

FIG. 3 is an end view of bracket 1 which shows the equidistant mounting of respective pairs of hydraulic cylinders 5 with the plate/cell frame handles 9 extending from each side of a plate/cell frame stack with the opposite shifter carriages 10 extending thereunder.

FIG. 4 is a blow-up of the plate handle-shifter mechanism interface showing pawl 11a picking up handle 9, i.e., abutting to move plate 8a slidingly along rail 2. A suitable rail cap 2a made of Teflon plastic or other suitable material on the top of rails 2 allows low friction for the moving plates. The threaded block 14 is suitable on a support track 13 extending from an outer edge 2b of rails 2. Track 13 also supports each of the screw bearings 17.

FIG. 5 shows the overall shifting mechanism 70 particularly the two right angle gear boxes 16, 16 connecting line shafts 19a, 19b transmitting rotary motion through a phase box 18. The phase box may be of the type manufactured by Cyclo-Index, Carthage, Mo. for providing a continuous positive mechanical relationship between the input and output shafts 19a, 19b respectively so as to synchronize the movements of carriages 10, 10a to simultaneously pick up or abut the opposite handles 9 of a particular plate.

FIG. 6 shows the shifter carriage in more detail particularly the shape of pawls 11, 11a and the pivoting movement about pivot pins 11b. Pawl 11 may be activated upward to move a plate left to right or pawl 11 activated upward to move a plate right to left. Both pawls may be activated downward in a known manner, to allow plate handles to pass over the top of the pawl housing 11c.

FIG. 7 shows the scissor mechanism 50 in more detail where scissor legs 22, 22a have a center mid-space pivot 21 and the ends of the legs are pivoted about pins 21a extending through pivot brackets 23, 24. Brackets 23 each included a vertical elongated slot 23a permitting the pivoted arms 22, 22a to raise as the distance between the cylinder bracket 1 and follower 3 increases. A disengagement mechanism 55 for the upper portion of arm 22a is provided so that when a particular press pressure is reached when the plate/cell frames are stacked in a closed position or an uneven force occurs resulting in disengagement of a detent ball in the mechanism, the follower becomes free of the restraint of the scissors mechanism allowing the follower to "match" the plates in the stack. It has been found that cumulative errors in the machining or manufacture of the plates/cell frames can amount to 0.5 cm or more in a stack of 60 plates/cell frames. When the follower hits a portion of the abutting plate/cell frame which represents the cumulative errors a high force can build up on that "high" spot such as at a corner, which can possibly damage a cell membrane held between two frames. The disengagement mechanism allows the follower to have a degree of freedom sufficient so that the follower plate-touching surface 3a (FIG. 2) can "match" or conform to the parallel or unparallel (due to the error buildup) exterior surface 8a' of plate 8a in the stack. The upper end of scissors arm 22a is pivotably connected to a detent pivot arm 25 which extends into a detent arm housing 33, the latter mounted by bolts 26 to the cylinder bracket 1.

As more clearly shown in FIG. 9 the arm 25 is held in housing 33 by a detent ball 36 extending into a detent 36a in arm 25. The detent ball 36 is spring-activated by compression spring 35 extending from a spring housing 31 connected to housing 33. A spring compression capscrew 32 and jam nut 34 serves to adjust the compression of the spring by movement of spring plate 35a. A retaining bolt 30 is threaded into the inner end of arm 25, the head of the bolt 30 acting as a stop and allowing for limited outward movement of the arm 25 from housing 33 beyond the detent and detent ball aligned position so that the scissors arm 22a is not fixed by the detent and detent ball in housing 33. An adjustment screw 28 and lock nut 29 (FIG. 7) is mounted on lug 27 fixed to bracket 1 for adjustment of housing 33 to insure that the follower is parallel to the head. A small hydraulic cylinder 31a can be substituted for the spring mechanism so that upon a prescribed stack-closing main cylinder 5 pressure being reached the pressure is released on the ball allowing it to move out of notch 36a. Pressure switch 31c (FIG. 10) sends a pressure signal through line 31b to operate hydraulic cylinder 31a in this embodiment.

FIG. 8 illustrates a set of scissor mechanisms which extend in a central horizontal position inside the vertical pair scissor mechanisms. This insures that both vertical and horizontal parallelism is maintained resulting in planar parallelism. The horizontal scissors will also include a leg disengageable in the manner shown in FIG. 9.

FIG. 10 shows a built-in special pilot operated check valve. Check valves have been used in the head of a cylinder, but in the present invention pressure must be varied in order to maintain a constant seal pressure on the plate/cell perimeter as the pressure inside the plate/cell frame varies. Hydraulic oil pressure is introduced in line 38 and by-passes check valve 40 in case the pressure needs to be reduced. The cylinder pressure must be raised and lowered to accommodate changes in internal pressure of plates or cells thus giving a constant sealing pressure on the sealing perimeter of the plate or cell. This can be controlled by a 4-20 ma cell pressure signal indicated in FIG. 2 by dash line 46 from pressure switch 45 to a pumping unit 42 and the oil returns to tank 44 under control of control valve 39. This valve is held open by an electric or air or an hydraulic oil pilot. Upon loss of pilot signal, valve 39 automatically goes to N.C. (normally closed) position and check valve 40 locks the cylinder position. When opening the press/cell holder by oil pressure to line 39, check valve 40 is held open by oil pressure in line 41. Line 37 is the piston rod retract line while line 38 provides pressurized oil to extend the piston rod(s) from the cylinder(s). Cylinder end cap 49 is recessed in cylinder bracket 1 facing the plate or cell stack while cylinder end cap 48 is on the opposite side of bracket 1.

The above description of embodiments of this invention is intended to be illustrative and not limiting. Other embodiments of this invention will be obvious to those skilled in the art in view of the above disclosure.

I claim:

1. In a press for holding a stack of filter plates/cell frames, said press comprising a pair of spaced parallel side rails, a fixed bracket, a movable follower for closing and sealing said stack against a fixed head piece, and at least one closing cylinder on said bracket and having an associated piston rod extending between said bracket and said follower; the improvement comprising:

a first shifter carriage movably positioned with respect to a first side rail on one side of the press; a second shifter carriage movably positioned with respect to a second side rail on an opposite side of said press; a first lead screw extending parallel to said first side rail for driving said first shifter carriage; a second lead screw extending parallel to said second side rail for driving said second shifter carriage; and means for connecting said first and second lead screws such that said first and second shifter carriages move in unison to shift individual or groups of filter plates/cell frames in said stack along said first and second side rails.

2. The press of claim 1 in which said means for connecting further includes a motor means for driving one of said lead screws in clockwise or counterclockwise direction, a threaded block on each of said first and second shifter carriages in engagement with a respective one of said lead screws for moving said shifter carriages in unison in forward and reverse directions with respect to each of said first and second rails, a pair of right angle gear boxes extending between said screws and an index phase box for synchronizing movement of said filter plates/cell frames by said first and second shifter carriages.

3. The press of claim 2 in which each of said first and second carriages include pawl means operably associable with opposed side edges of said individual or groups of filter plates/cell frames to shift said filter plates/cells frames.

4. The press of claim 3 wherein said pawl means is operable to abut opposed handles on a particular filter plate/cell frame so as to move the particular filter plate/cell frame in parallelism to said first and second rails.

5. The press of claim 1 in which said means for connecting comprises a gear train mechanically connecting said lead screws and a single motor driving one of said lead screws and said first shifter carriage, the other of said lead screws being solely driven through said gear train to drive said second shifter carriage in unison with the first shifter carriage.

6. The press of claim 5 in which said gear train includes a pair of right angle gear boxes connected to respective ones of said lead screws and at least one drive shaft extending transversely of said lead screws and connected to said gear boxes.

* * * * *